(12) United States Patent
Kropp et al.

(10) Patent No.: US 6,457,875 B1
(45) Date of Patent: Oct. 1, 2002

(54) ELECTRO-OPTICAL ARRANGEMENT

(75) Inventors: Joerg-Reinhardt Kropp, Berlin (DE); Frank Meyer-Gueldner, Berlin (DE); Michael Kneier, Berlin (DE)

(73) Assignee: Infineon Technologies AG, Munich (DE)

(*) Notice: Subject to any disclaimer, the term of this patent is extended or adjusted under 35 U.S.C. 154(b) by 0 days.

(21) Appl. No.: 09/509,436

(22) PCT Filed: Sep. 24, 1998

(86) PCT No.: PCT/DE98/02851
§ 371 (c)(1),
(2), (4) Date: Sep. 18, 2000

(87) PCT Pub. No.: WO99/15927
PCT Pub. Date: Apr. 1, 1999

(30) Foreign Application Priority Data

Sep. 24, 1997 (DE) .......................... 197 42 895

(51) Int. Cl.⁷ ................................................ G02B 6/36
(52) U.S. Cl. .............................. 385/89; 385/33; 385/93
(58) Field of Search ................................ 385/89, 33, 93

(56) References Cited

U.S. PATENT DOCUMENTS

| 4,720,634 A | | 1/1988 | D'Auria et al. |
| 4,732,446 A | | 3/1988 | Gipson et al. |
| 5,028,110 A | | 7/1991 | Plummer |
| 5,093,879 A | * | 3/1992 | Bregman et al. ...... 250/227.11 |
| 5,201,018 A | | 4/1993 | Coden et al. |
| 5,230,030 A | | 7/1993 | Hartman et al. |
| 5,550,941 A | * | 8/1996 | Lebby et al. ................ 385/129 |
| 5,742,720 A | * | 4/1998 | Kobayashi et al. |

FOREIGN PATENT DOCUMENTS

| DE | 26 54 402 A1 | 6/1978 |
| DE | 40 09 323 C1 | 2/1991 |
| DE | 41 13 795 C1 | 12/1992 |
| DE | 196 01 955 A1 | 7/1997 |

* cited by examiner

Primary Examiner—Hung N. Ngo
(74) Attorney, Agent, or Firm—Laurence A. Greenberg; Werner H. Stemer; Gregory L. Mayback

(57) ABSTRACT

The arrangement has at least two electrooptic transducers (1, 2) with in each case one optically active zone (1a, 2a). Optical connections (12, 14) which are assigned to the transducers are adjacent at a spacing (a). Optical coupling paths (8, 9) run via a coupling device (6) between the connections (12, 14) and the respectively assigned optically active zones (1a, 2a) In order in the case of a very tight spacing (a) to permit a favorable crosstalk response and a cost effective design, the coupling paths (8, 9) run in such a way that the spacing (A) between two optically active zones (1a, 2a) is greater than the spacing (a).

13 Claims, 6 Drawing Sheets

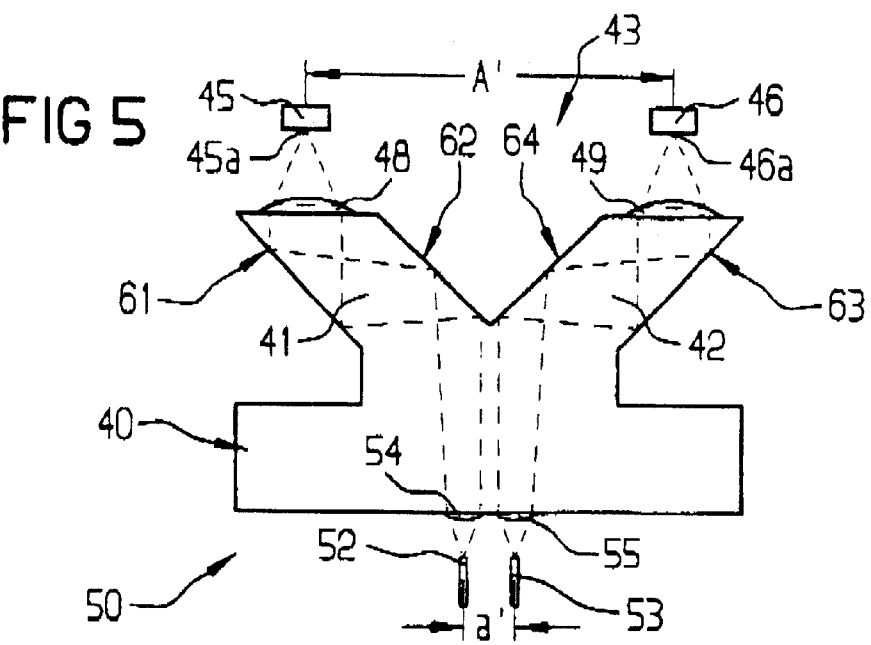
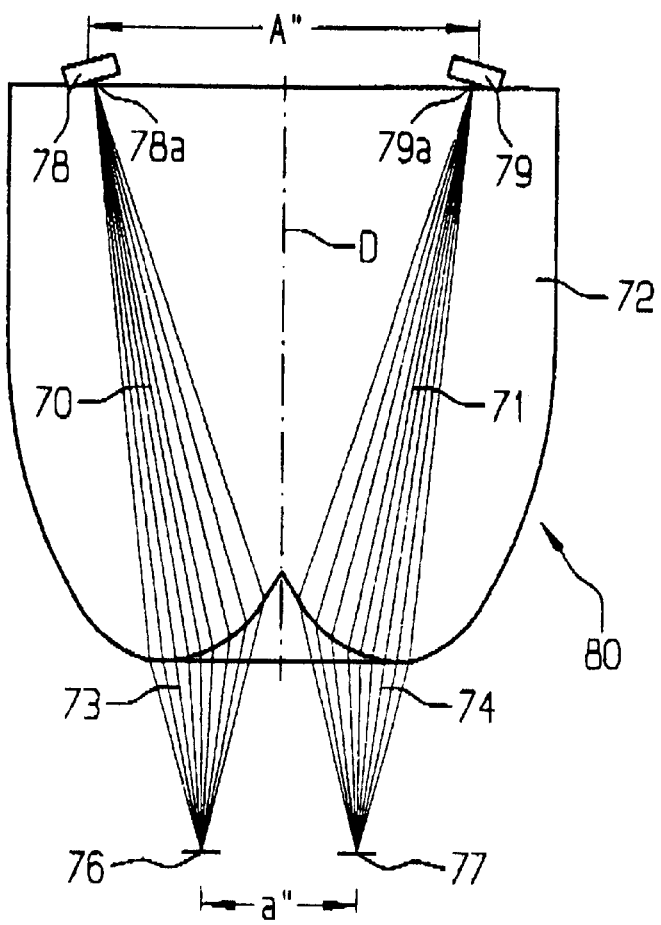

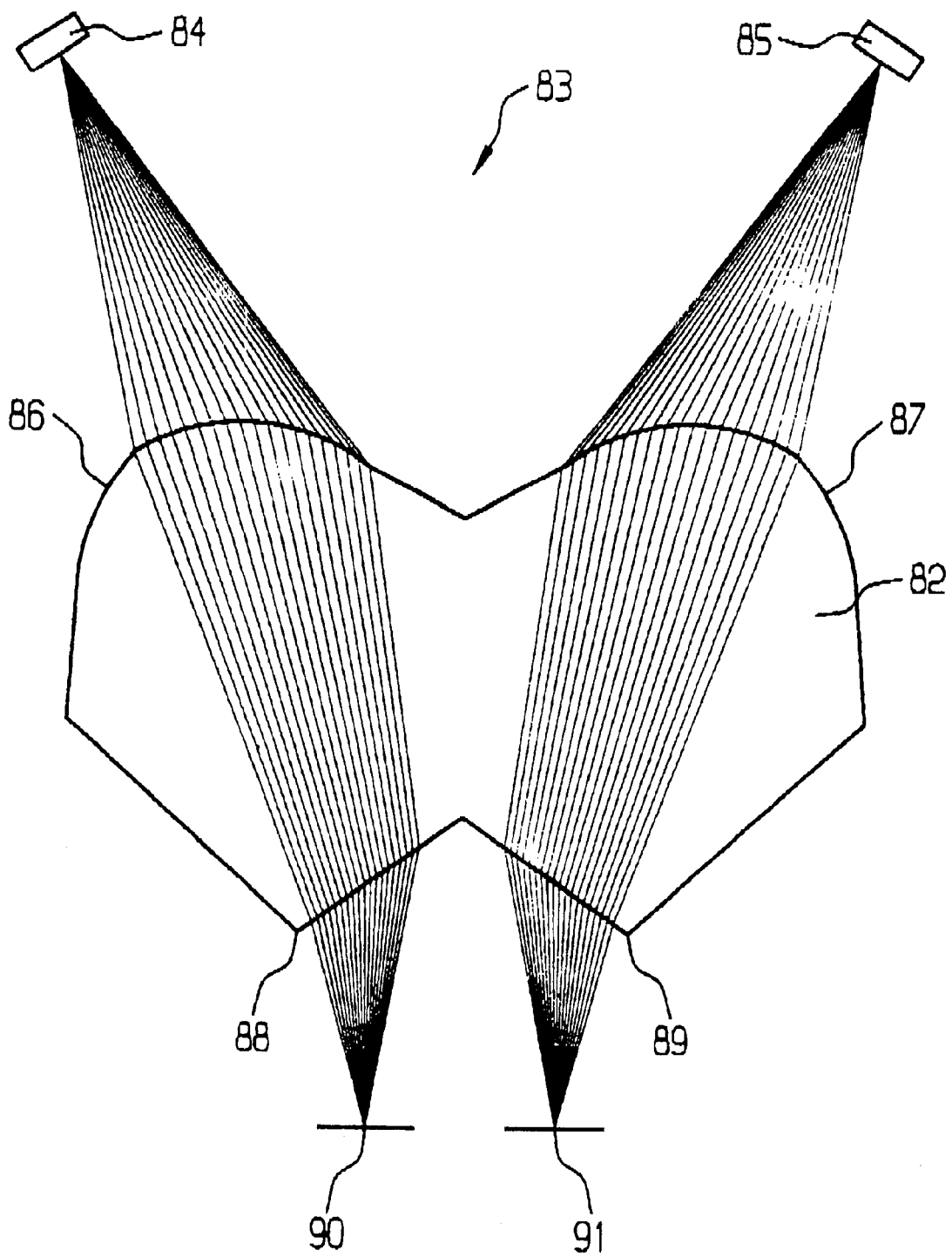

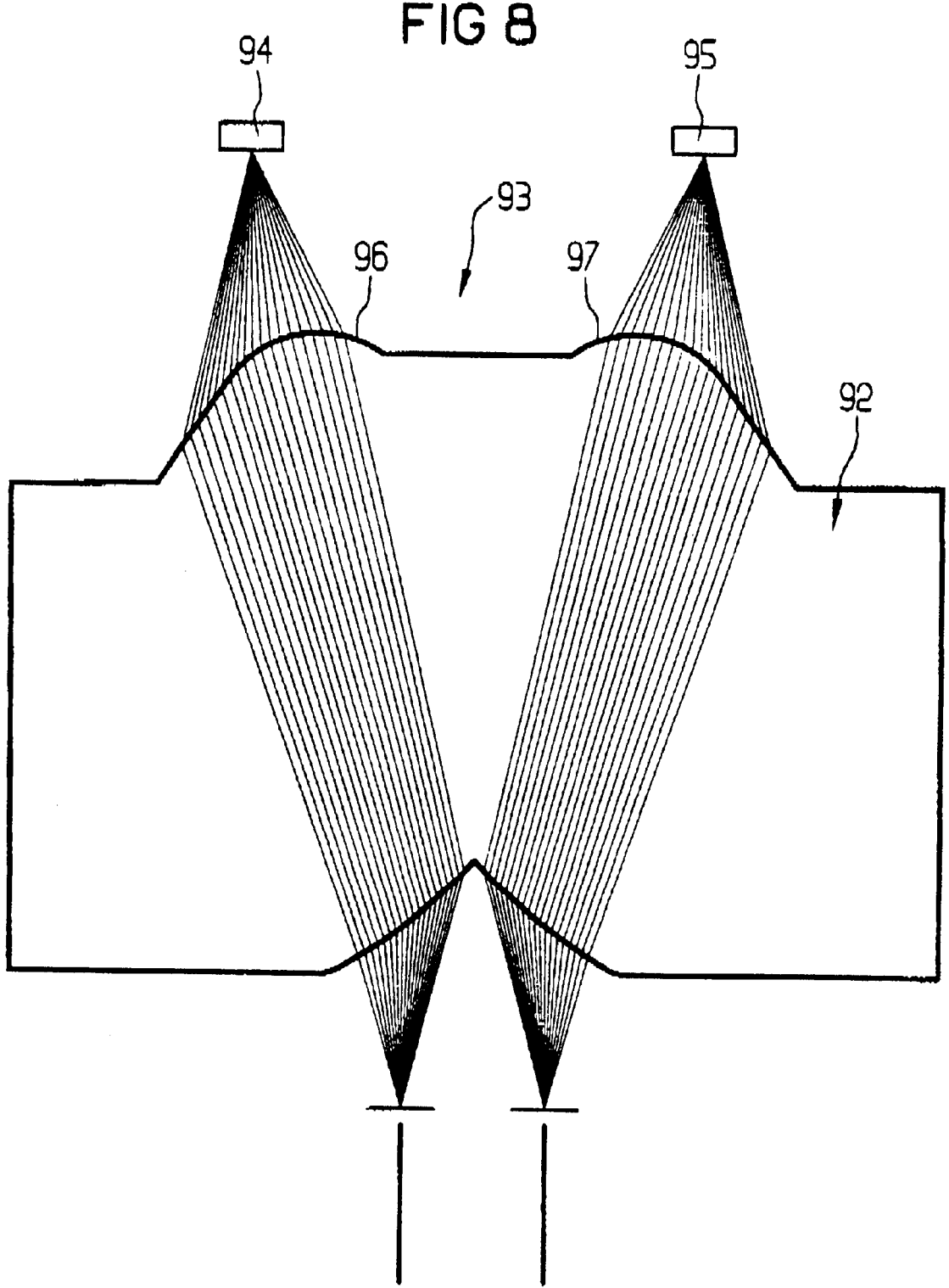

ELECTRO-OPTICAL ARRANGEMENT

BACKGROUND OF THE INVENTION

Field of the Invention

The invention is in the field of optical data transmission engineering and relates to electrooptic coupling arrangements with the aid of which electrooptic component at the arrangement end can be coupled to coupling partners, in particular to optical conductors. These components, which are also termed electrooptic transducers below, can be constructed as a transmitter (for example laser diode) or receiver (for example photodiode). When driven electrically, an electrooptic transducer constructed as a transmitter converts the electric signals into optical signals which are emitted in the form of optical signals. When it has optical signals applied to it, a transducer constructed as a receiver converts these signals into corresponding electric signals which can be tapped on the output side. The region of a transducer in which the above-described signal conversions are performed is also denoted below as an optically active zone.

The invention relates to an electrooptic arrangement having at least two electrooptic transducers with in each case one optically active zone, having optical connections which are assigned to the transducers and are adjacent at a spacing, and having a coupling device via which optical coupling paths run between the optical connections and the respectively assigned optically active zones.

Such an arrangement disclosed in DE 196 01 955 A1 has a multiplicity of electrooptic transducers (transmitters), each having an optically active zone. When driven electrically in an appropriate fashion, the optically active zones emit radiation which passes via a coupling device into terminals or terminal coupling surfaces of individual optical conductors which are individually assigned to the transducers. The optical conductor ends are arranged adjacently parallel to one another at a regular spacing (increment). The optically active zones and individual lenses constructed on the coupling device on the optical conductor side are constructed at the same spacing or increment. The radiation emitted by the optically active zones passes in this case along coupling paths, which run parallel at a constant spacing through the coupling device, into the optical conductor terminal respectively assigned.

In optical data transmission engineering, there is an increasing need to implement ever higher transmission capacities in an ever smaller space and at costs which are as low as possible. This holds, in particular, for multichannel electrooptic arrangements to which a plurality of optical conductors or other coupling partners are to be connected in each case. The connections are in this case to exhibit a comparatively low spacing from one another (also denoted as pitch or increment). Consequently, the optical coupling paths must also move closer together so that in accordance with the prior design principles the optically active zones of the transducers would also need to be arranged more tightly next to one another. However, this gives rise more sharply to problems of optical and/or electric crosstalk, to a higher outlay on adjustment and to an expensive component miniaturization. The problem of mutual channel influencing (crosstalk) is particularly grave in the case of receiver/transmitter modules (transceivers) with transmitting and receiving channels situated tightly next to one another, because the differences in electric level between transmitting and receiving channels are frequently several orders of magnitude.

SUMMARY OF THE INVENTION

It is therefore the object of the invention to create an electrooptic arrangement which, while avoiding an impermissibly high optical and/or electric crosstalk, permits a very tight arrangement of a plurality of optical connections without a high outlay on adjustment and expensive component miniaturization, and thus does so cost-effectively.

According to the invention, this object is achieved in the case of an arrangement of the type mentioned at the beginning by virtue of the fact that the coupling paths run in such a way that the spacing between two optically active zones is greater than the spacing between the assigned optical connections.

An important advantage of the invention consists in that the beams coming along the optical coupling paths from the optical connections and/or passing to the connections are further removed from one another at the transducer end than is prescribed by the spacing (pitch) of the assigned connections. This sharply reduces the sensitivity with respect to electric interference, for example in the case of subsequent electric processing at the receiver end. As a result, there is a relatively large mounting space available on the transducer side independently of the increment of the optical connections, and this has an advantageous effect with regard to the transducer adjustment and the transducer dimensioning.

An advantageous refinement of the invention which manages without mirror surfaces on the coupling device, and thereby has a particularly simple design and reduced transmission losses provides that the coupling device in each case has a boundary with an optically denser medium, which in each case faces an optical connection and is aligned in such a way that the spacings of the coupling paths between the connections and the assigned optically active zones are enlarged toward the optically active zones.

A particularly strong deflection of the coupling paths, and thus a particularly wide spacing of the coupling paths on the transducer side can be achieved according to an advantageous development of the invention in a very small space by virtue of the fact that the coupling device has at least one mirror surface via which at least one coupling path runs between a connection and the assigned optically active zone in such a way that the spacings of the coupling paths between the connections and the assigned optically active zones are enlarged toward the zones.

With regard to the formation and guidance of the beams, further preferred refinements of the invention provide that at least one lens of the coupling device faces the connections, or that at least one lens of the coupling device faces the respective optically active zone, According to an advantageous development of the invention, the mounting space available for arranging the transducers can be utilized particularly well by virtue of the fact that the coupling device spreads the coupling paths apart in a plurality of dimensions on the transducer side.

It is preferred in terms of production engineering if the coupling device is constructed in one piece. It is particularly preferred that electrooptic transducers and the coupling device can form a single-piece subassembly.

According to a further preferred development of the invention, a particularly simple refinement of the optical connections which can be adapted simply and as required to appropriate standards is possible by virtue of the fact that the connections are part of an optical plug-in device which is constructed for connecting a plurality of optical conductors of an optical conductor plug-in connector.

With regard to the implementation of transceivers described at the beginning, a further preferred refinement of the invention provides that the arrangement comprises a transducer constructed as an optical transmitter and a transducer constructed as an optical receiver, and in that the transducers are arranged on two separate circuit carriers. The arrangement of the transmitter and the receiver on separate circuit carriers is advantageous, in particular, with regard to the outlined crosstalk effects, the production engineering and mounting engineering and the test possibilities.

According to a further advantageous development of the invention, particularly narrow designs are possible by virtue of the fact that the separate circuit carriers are arranged in the direction of the optical conductor longitudinal axes and perpendicular to the mounting plane of the arrangement.

A further refinement of the invention, which is preferred with regard to the transducer arrangement and the use of transducers with vertically emitting (for example so-called VCSEL) or receiving optically active zones provides that the coupling device directs the coupling paths away from one another in opposite directions by 90° in each case.

The invention is explained in more detail below with the aid of a plurality of exemplary embodiments; in the drawing:

BRIEF DESCRIPTION OF THE DRAWINGS

FIG. 5 shows a further arrangement according to the invention, and FIGS. 6 to 9 show arrangements according to the invention having coupling devices with differently shaped lens regions.

DESCRIPTION OF THE PREFERRED EMBODIMENT

Figure 1:
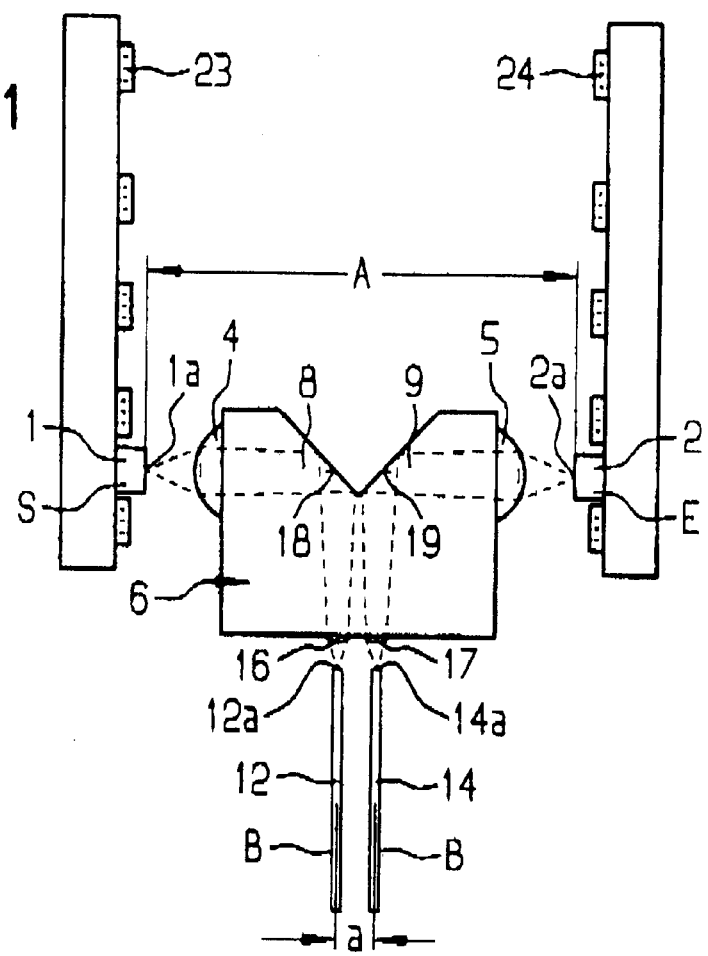
FIGS. 1 and 2 show a first arrangement according to the invention, in plan view and a perspective illustration.
Figure 2:
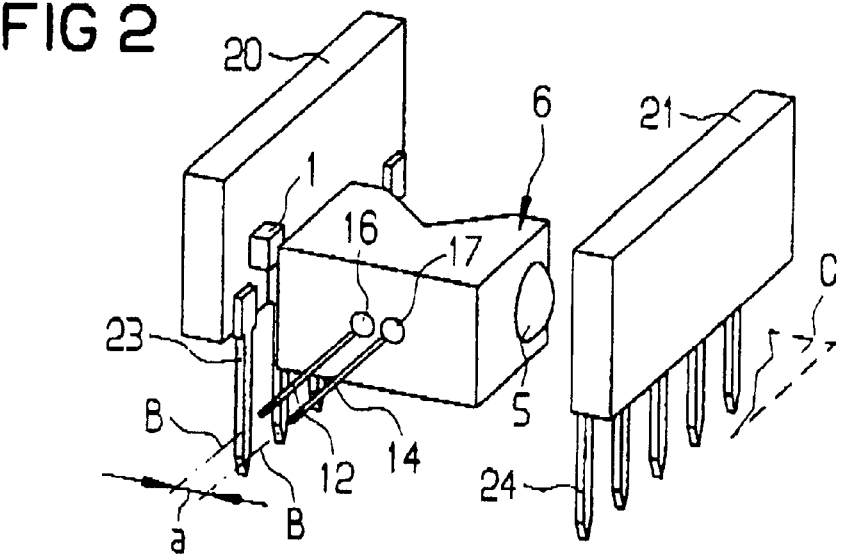

According to FIGS. 1 and 2, the electrooptic arrangement, which is preferably used in an electrooptic module (transceiver), has two electrooptic transducers 1, 2 which are constructed as a vertically emitting laser transmitter S (VCSEL) and as a vertically receiving optical receiver E. In each case, the transducers have an optically active zone 1a, 2a which converts electric signals into optical ones and optical signals into electric ones. The zones 1a, 2a face one another.

The lenses 4, 5 are constructed on the side faces of a coupling device 6 and can advantageously also be constructed in one piece as a component of the coupling device. The lenses 4, 5 face the active zones 1a and 2a, respectively, and effect optimum beam coupling to the zones 1a, 2a. The coupling device preferably consists of a plastic which has a high optical transparency for the wavelength region used. The coupling device guides the radiation or coupling paths 8, 9 between in each case one of the transducers 1, 2 or the optically active zone 1a, 2a thereof, and optical conductor ends 12, 14 assigned thereto. The ends 12, 14 form optical connections for coupling optical conductor cables (not illustrated in more detail). The connections 12, 14 are arranged spaced apart at an average spacing a between their longitudinal axes B, and are aligned with their respective end faces 12a, 14a aligned in each case with a lens 16, 17 constructed on the coupling device 6. The lenses 16, 17 ensure that the beam divergence inside the coupling device 6 is smaller than between the lenses 16, 17 and the connections 12, 14.

Consequently, the coupling paths 8, 9 run between the connections 12, 14 and the optically active zones 1a, 2a via the coupling device 6. In this process, the coupling paths 8, 9 or the beams running along the coupling paths are deflected away from one another by 90° in each case at a respective mirror surface 18, 19 of the coupling device 6. The beams are thereby directed away from one another substantially in the region of the zones 1a, 2a with respect to the spacing a prescribed by the connections 12, 14, and can thus be focused at a substantially larger spacing A onto the zones 1a, 2a. It is thereby possible to implement the mutual spacing A of the zones 1a, 2a to be substantially greater than the spacing a between the connections 12, 14.

The transducers 1, 2 are arranged on separate circuit carriers 20, 21. The circuit carriers 20, 21 also carry control and/or driver circuits (not illustrated in more detail) for driving the transducer 1 or for conditioning electric signals supplied by the transducer 2. Arranged on the surface of the circuit carriers 20, 21 which face the coupling device are terminal contacts 23, 24 via which it is possible to make contact with the circuit carriers or the electric circuits arranged on the latter. Thus, it is possible via the terminal contacts 23, for example, to drive the transducer electrically using electric input signals which are fed to the transducer after appropriate conditioning and are converted by the active zone 1a into optical signals (light signals) and pass to the connection 12 along the coupling path 8. The circuit carriers 20, 21 are placed on edge and oriented in the direction of the optical conductor longitudinal axes B, and thus perpendicular to the mounting plane or connecting plane C of the arrangement. The entire arrangement is preferably accommodated in a module housing (not illustrated).

Figure 3:
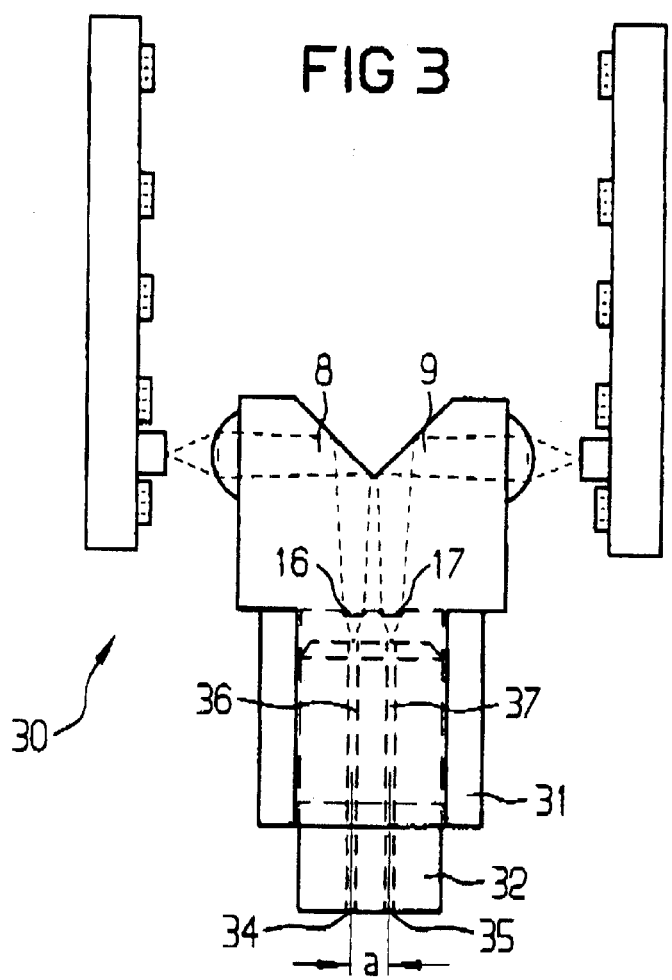
FIGS. 3 and 4 show a refinement of the embodiment according to FIGS. 1 and 2 modified on the optical connecting side, in plan view and a perspective illustration.
Figure 4:
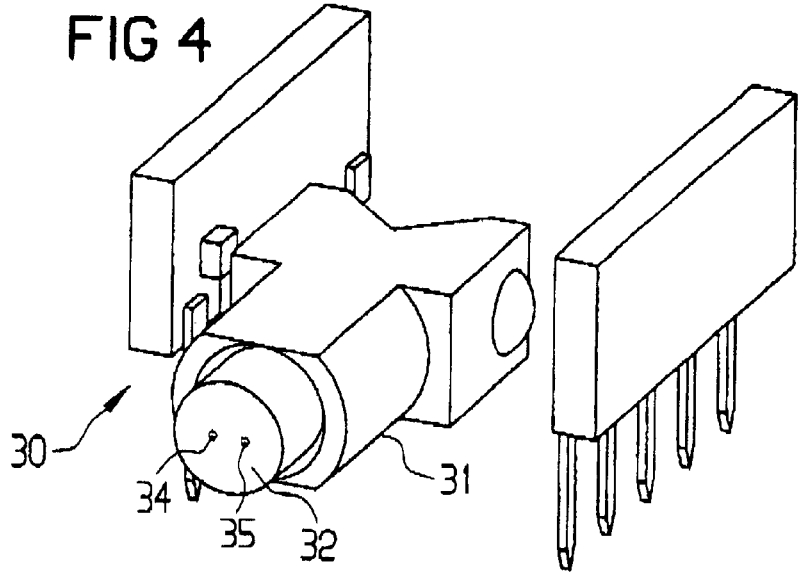

FIGS. 3 and 4 indicate a variant of the arrangement illustrated in FIGS. 1 and 2, only the region of different construction being described in more detail. On the connecting side 30, the arrangement has a socket-contact 31 into which there is inserted a plug pin 32 (illustrated only by way of indication). The plug pin 32 contains axially parallel longitudinal bores 34, 35 which are spaced apart at the desired prescribed spacing (increment) a of the previously described connections 12, 14 (FIG. 1). By using the optical conductor plug 32, it is possible for ends of optical conductors 36, 37 which are to be coupled to be positioned in a simple way which is detachable with respect to the lenses 16, 17, and thus to position them with reference to the coupling paths 8, 9. Thus, it is possible in this way to implement the previously described beam path between the optical conductors (not illustrated in more detail in FIGS. 3 and 4) and the optically active zones 1a, 2a.

FIG. 5 shows a further possible refinement of an arrangement according to the invention, which is characterized, in particular, by a modified shape of the coupling device 40, and thus by a correspondingly modified profile of coupling paths 41, 42. Both on the side ("transducer side") 43 of the transducers 45, 46, which are indicated only diagrammatically and illustrated without further elements on the side of the circuit substrate, the coupling device 40 also has lenses 48, 49 via which in each case optimum beam focusing is ensured between the coupling device 40 and the respective optically active zones 45a, 46a of the transducers 45, 46. Furthermore, provided in a way previously described on the side of the connections 52, 53 ("connection side" 50) are lenses 54, 55 by means of which the beam divergence inside the coupling device 40 is reduced as compared with between the connections 52, 53 and the lenses 54, 55. For each coupling path 41, 42, the coupling member 40 has two mirror surfaces 61, 62; 63, 64 which slope by 45° in each case to the optical axis and at which the radiation running along the coupling paths 41, 42 is deflected in each case by 90°—specifically in the opposite direction. The overall result is a substantially increased spacing between the focal points of the coupling paths 41, 42 on the transducer side, which is denoted in FIG. 5 by A'. This spacing A' between the focal points permits an arrangement of the active zones 45a, 46a at a wider spacing than the spacing a' between the connections 52, 53. By contrast with the exemplary embodiments illustrated in FIGS. 1 to 4, the coupling paths 41, 42 run outside the coupling device 40 in parallel in each case.

FIGS. 6 to 9 show different possible refinements of a coupling device, the remaining components of the arrangement being illustrated only schematically.

In accordance with FIG. 6, coupling paths 70, 71 run in each case over lens surfaces 73, 74 which are inclined symmetrically to the central axis D of a coupling device or a coupling member 72, the lens surfaces being struck outside the axis. The coupling device 72 preferably consists of a plastic which is particularly transparent to the optical radiation, and therefore of a medium which is optically denser than the surroundings. The lens surface or boundary 73, 74, facing an optical connection 76, 77 illustrated only schematically, of the coupling device 72 is aligned in such a way that the spacing a" of the coupling paths 70, 71 between the connections 76, 77 and the assigned optically active zones 78a, 79a of the transducers 78, 79 expand to a spacing A". The transducers 78, 79 and the coupling device 72 preferably form a single-piece subassembly 80.

FIGS. 7 and 8 show further possible configurations of coupling devices 82, 92, which have boundaries 86, 87; 96, 97 which are formed on the side 83, 93 of the transducers 84, 85; 94, 95 and act as lenses.

In accordance with FIG. 7, boundaries 88, 89, deflecting radiation by refraction, on the side of the connections 90, 91 are constructed as flat boundaries at which the coupling paths are deflected away from the common plane of symmetry F by the difference in density.

Figure 9:
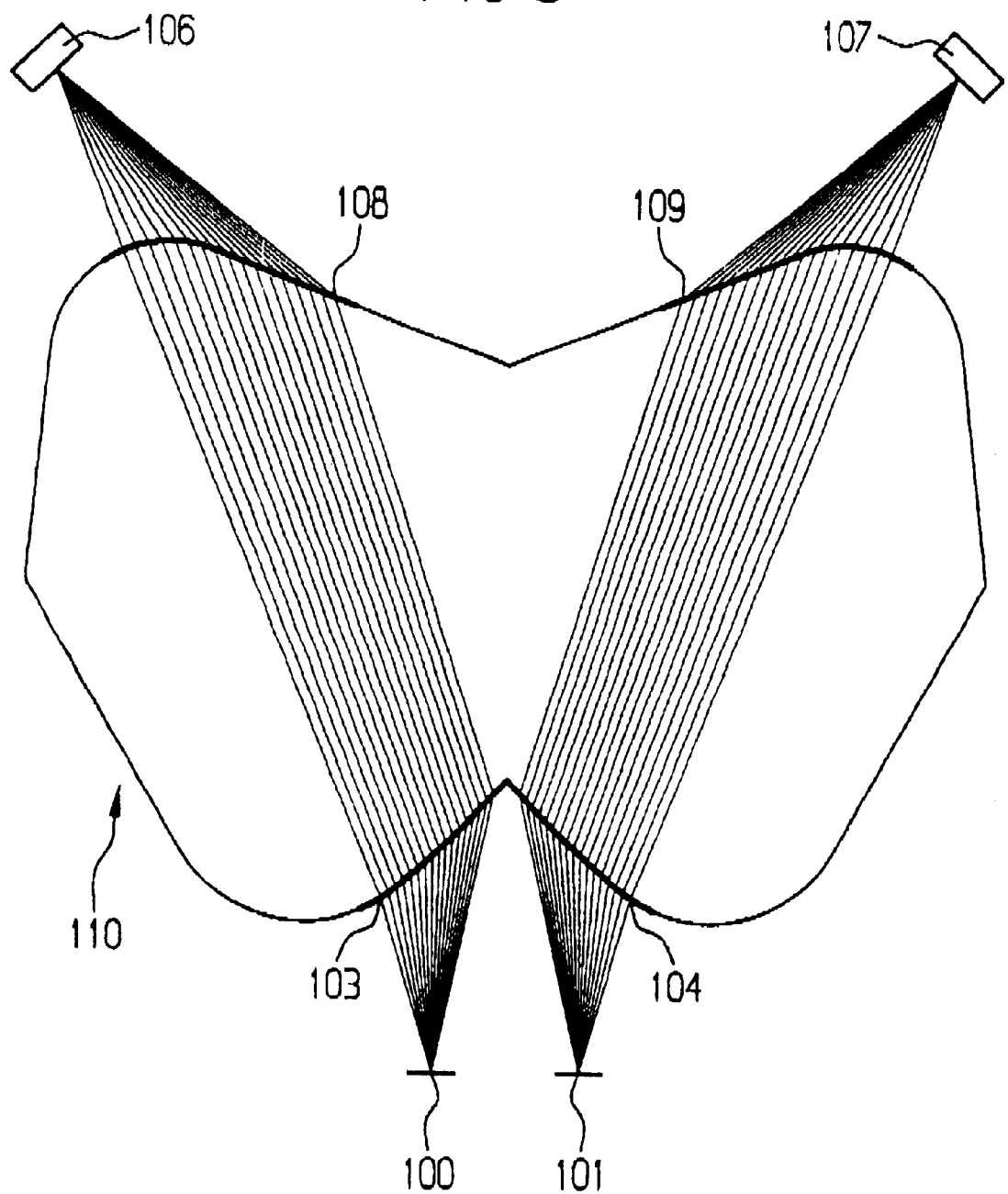

This effect can be still further amplified in accordance with the embodiments shown in FIGS. 8 and 9 by also constructing as lenses the boundaries 103, 104 facing the optical connections 100, 101 (FIG. 9) and by configuring the boundaries 108, 109 facing the transducers 106, 107, of the coupling device 110 such that the coupling paths 112, 114 and thus the course of the beam outside the coupling device, as well, diverge even further. It is possible as a result to achieve a particularly wide beam spacing on the transducer side in conjunction with a compact coupling device. By suitable configuration of the coupling device, the coupling paths can also be focused on the transducer side onto focusing planes which differ in two dimensions, with the result that the corresponding active zones can be arranged in different planes by widening the spacings of the coupling paths on the transducer side.

What is claimed is:

1. An electrooptic arrangement, comprising:
   at least two electrooptic transducers each having an optically active zone disposed at a mutual spacing;
   optical connections selected from the group consisting of terminals and terminal coupling surfaces of individual optical conductors, respectively assigned to said transducers and disposed at a mutual spacing smaller than the mutual spacing between said optically active zones of said transducers;
   a coupling device having a connecting region on a connecting side, at least one transducer-side region, and optical coupling paths extending between said connections and said respectively assigned optically active zones;
   said coupling device being constructed as a molded plastic part having a shape determining a profile of said coupling paths between the connecting region said transducer-side region.

2. The arrangement according to claim 1, wherein said coupling device is formed with boundaries towards an optically denser medium, each of said boundaries faces a respective said optical connection and is aligned such that distances of said coupling paths between said connections and said assigned optically active zones are enlarged towards said zones.

3. The arrangement according to claim 1, wherein said coupling device is formed with at least one mirror surface via which at least one coupling path runs between a respective said connection and said assigned optically active zone such that spacings of said coupling paths between said connections and said assigned optically active zones are enlarged toward said zones.

4. The arrangement according to claim 1, wherein said coupling device has at least one lens facing said connections.

5. The arrangement according to claim 1, wherein said coupling device has at least one lens facing said respective optically active zone.

6. The arrangement according to claim 1, wherein said coupling device is configured to spread said coupling paths apart in a plurality of dimensions on a side towards said transducers.

7. The arrangement according to claim 1, wherein the coupling device is of uniform one-piece construction.

8. The arrangement according to claim 1, wherein said electrooptic transducers and said coupling device are formed as a single-piece subassembly.

9. The arrangement according to claim 1, wherein said connections are a part of an optical plug-in device configured to connect a plurality of optical conductors of an optical conductor plug-in connector.

10. The arrangement according to claim 1, wherein said transducers include a transducer constructed as an optical transmitter and a transducer constructed as an optical receiver, and said transducers are arranged on two separate circuit carriers.

11. The arrangement according to claim 10, wherein said connections extend along longitudinal axes orthogonal to a mounting plane of the arrangement, and said separate circuit carriers are arranged in a direction of said longitudinal axes and perpendicular to the mounting plane of the arrangement.

12. The arrangement according to claim 1, wherein said coupling device guides said coupling paths away from one another in opposite directions by 90°, respectively.

13. The arrangement according to claim 10, wherein said coupling device guides said coupling paths away from one another in opposite directions by 90°, respectively.

* * * * *